United States Patent [19]

Schneider

[11] Patent Number: 4,467,908

[45] Date of Patent: Aug. 28, 1984

[54] DEVICE FOR THE DISTRIBUTION OF UPRIGHT VESSELS

[75] Inventor: Egon Schneider, Neutraubling, Fed. Rep. of Germany

[73] Assignee: Krones AG Hermann Kronseder Maschinenfabrik, Worth, Fed. Rep. of Germany

[21] Appl. No.: 423,918

[22] Filed: Sep. 27, 1982

[30] Foreign Application Priority Data

Oct. 17, 1981 [DE] Fed. Rep. of Germany ....... 3141364

[51] Int. Cl.³ .............................................. B65G 47/84
[52] U.S. Cl. ..................................... 198/441; 198/481
[58] Field of Search ................................ 198/441, 481

[56] References Cited

U.S. PATENT DOCUMENTS

| 2,827,998 | 3/1958 | Breeback | 198/441 |
| 2,829,757 | 4/1958 | Breeback | 198/434 |
| 2,906,580 | 9/1959 | Terry et al. | 198/481 X |
| 3,087,596 | 4/1963 | Fulton | 198/441 |
| 3,687,285 | 8/1972 | Messervey | 198/441 X |
| 3,975,260 | 8/1976 | Peyton et al. | 198/441 X |

FOREIGN PATENT DOCUMENTS 2052717 5/1971 Fed. Rep. of Germany ...... 198/481

54-159971 12/1979 Japan .................................. 198/441

Primary Examiner—Robert J. Spar
Assistant Examiner—Jonathan D. Holmes
Attorney, Agent, or Firm—Fuller, House & Hohenfeldt

[57] ABSTRACT

A continuously rotating rotor has pockets in its periphery for transporting bottles. The rotor operates next to two star-wheel conveyors rotating at lower peripheral speed and oppositely of the rotor. With each second pocket of the rotor is correlated a cam controlled slide member which gradually transfers the vessels at a first transfer point into the more slowly travelling pockets of the first star-wheel conveyor. The other pockets of the rotor lying therebetween have cam controlled clamps which bring each second bottle to a second transfer point whereby means of two stationary guide members it is gradually transferred into the more slowly traveling pockets of the second star-wheel conveyor. Between the pitch circles of the rotor pockets and the pitch circles of the star-wheel conveyors there is a space somewhat less than the bottle diameter. By transfer of the vessels from the rotor into the two star-wheel conveyors, a perceptible reduction of the conveyor speeds is possible. The star-wheels discharge the bottles in two rows on associated linear conveyors, thus dividing the speed again.

15 Claims, 2 Drawing Figures

DEVICE FOR THE DISTRIBUTION OF UPRIGHT VESSELS

BACKGROUND OF THE INVENTION

The invention disclosed herein relates to apparatus for dividing a single row or column of moving vessels into a plurality of moving rows or columns.

In the commercial processing of many different types of articles such as bottles in a bottling plant it is often desirable that the bottles leave one step of the process to be transferred to a next stage and that they be divided into two or more streams, rows or columns to be fed separately to their destinations in the next stage or stages.

An illustrative device for separating a single row of moving articles into two columns is shown in U.S. Pat. No. 3,087,596. In the patented device, the single row of articles are moving in a circular path on a rotating conveyor although the conveyor could be one that moves the bottles linearly in a single row as well. There is a rotating turret arranged generally tangentially to the line of movement of the articles on the conveyor. There are a plurality of pairs of gripper jaws mounted on the turret for relative movement toward and away from each other and extending generally radially outwardly from the turret. There are actuating means, including a stationary cam, adjacent the center of the turret, for closing each pair of jaws at a first station to grip an article between the jaws and take the article off of the conveyor and then to open the jaws at a second station to release a gripped article therefrom. The articles are released to a linear conveyor at a second station extending tangentially of the path of the orbiting jaws. Radially movable pushers mounted on the turret between alternate pairs of the jaws are operated by stationary cams for moving the pushers radially outwardly of the turret at the second station to push the alternate released articles radially away from the turret so that two laterally spaced rows of articles are produced on the linear conveyor. In this apparatus, one row of articles such as upright bottles is formed on one side or edge of the linear conveyor and another row is formed on the laterally spaced apart or opposite side or edge. The articles in each row on the linear conveyor are spaced apart longitudinally by twice the distance at which they are spaced apart while they are on the turret. One disadvantage of the patented apparatus is that the rectilinear speed of the articles on the linear conveyor is the same as the tangential speed that the articles have while on the turret. In cases where fragile and unstable articles such as bottles are being handled, it would be desirable to reduce the speed to minimize the likelihood of bottles tipping, possibly against each other, so as to increase the likelihood of breakage. Besides the inconvenience that results from breakage, noise is emitted when the bottles tip against each other. To avoid the consequences of bottle instability the apparatus has to be operated at a slower rate. Moreover, it is restricted to dividing a single row of articles into only two separate rows.

Another article dividing or distributing apparatus is described in German Laid Out Specification No. 1,084,640. In this apparatus there are two oppositely directed star-wheels that respectively remove alternate vessels that are moving in a single row on a rotating conveyor. Each of the star-wheels is driven in synchronism with the conveyor and they all have the same circumferential or peripheral speed. Every other or second pocket has a driven and guided slidable member which grips the articles such as bottles so that the bottles are transferred alternately onto the two star-wheels. A conveyor belt passes the output or discharge station of each star-wheel and the belt moves at a speed that is lower than the star-wheels so that upon issuing from the star-wheels the articles are slowed down somewhat. The reduction in spacing of the vessels attainable in this manner must be held within narrow limits on account of the great danger of tipping. This known apparatus is complex and costly to build and its space requirements are high because of using four star-wheels. Still it is not adapted to high rate article handling nor to division of a single row of articles into more than two rows.

U.S. Pat. No. 2,829,757 shows another type of apparatus for dividing a single row of moving articles such as bottles or glass vessels into two rows. This apparatus uses four star-wheels and conveyor-stars driven synchronously with one another at the same circumferential or peripheral speed. A swivel actuator switches the articles alternately to two transfer points. A conveyor worm is connected in series with each of the two conveyor-stars. The worms have continuously decreasing pitch which reduces the spacing between vessels to a minimum wherein they are in mutual contact. This apparatus has the desirable feature of reducing output conveyor speed or the speed of the vessels in the two rows. However, this apparatus has high manufacturing costs and takes up a lot of space. Moreover, when it is desired to change over to accommodate another vessel diameter, six machine elements must be changed, namely, the four conveyor-stars and the two conveyor worms along with the stationary guide members. The use of conveyor worms has the disadvantage of possibly damaging labels on bottles or vessels due to the rubbing action of the worms.

Another vessel dividing apparatus is shown in German Laid Open Specification No. 3,002,802. In this apparatus, star-wheels are provided with strikers or rams on every other or alternate pockets at their peripheries. The vessels are conveyed in the pockets through stationary guide members and out of the pockets between the actuators or a rack-belt rotating at lower circumferential or peripheral speed. The rack-belts travel over drive wheels seated on shafts of the star-wheels between the two star-plates so that the periphery of each star-wheel intersects the teeth on the rack belt at an angle of approximately 45°. This relatively large angle of intersection results in an impact type of wobbling movement of the vessels in the transfer area which cannot be wholly prevented by use of stationary guide members. Besides being complex and costly to build and requiring a lot of space, particularly for the two rack-belts with their drives and reversing wheels, this apparatus produces a lot of noise.

The difficulty of changing over from one vessel size to another has been mentioned already.

SUMMARY OF THE INVENTION

An objective of the present invention is to provide apparatus for distributing vessels into two or more rows which apparatus is simple in construction, operates with little noise and makes possible an appreciable reduction in output conveyor speed compared to input speed.

Briefly stated, the new vessel distributing apparatus has only three rotating transport or conveyor members, namely, a rotor and two adjacent star-wheels which are all provided with rigid pockets at their peripheries. The rotor has the general properties of a star-wheel. There are two vertically spaced apart stationary cams located above the star-wheel type rotor. Every other pocket, for instance, the odd number pockets on the periphery of the star-wheel type rotor is associated with a gripper that is actuated by one of the cams to grip a vessel at a first station out of the single row on the in-feed conveyor and to transport the vessel through a circular path to a second station where the one cam actuates the gripper to release the vessel to one of the pockets in the periphery of the first of two adjacent star-wheels. The alternate or every other pocket, that is, the even number pockets in the rotor each have a gripper that is operated by the other cam to grip a bottle out of the single row, transport it circularly, and release it at a second station wherein it can enter one of the pockets in the periphery of the second star-wheel. The two previously mentioned star-wheels that are adjacent the rotor are provided with cam operated ejection devices that eject alternate vessels from the alternate pockets in the periphery of the star-wheels to dispose alternate bottles in two laterally spaced apart rows on two different linearly moving conveyor belts. The relationship of the two star-wheels to the rotor and the linear conveyor is such that every time there is a transfer of the vessels in the sequence from the rotor to the respective star-wheels and then to the respective conveyors, the linear speed of the vessels is reduced and is lowest when the vessels in the four rows are on the linear output conveyors.

The new apparatus is provided with means for providing complete guidance of the vessels out of the pocket of the rotor and simultaneous guidance into the pockets of the star-wheels. The apparatus is particularly well-suited to high speed bottle processing machines such as bottle fillers, labelling machines, capping machines and so forth.

Further features of the invention which contribute significantly to a simple, operationally safe and impact-free vessel movement even though there is a large reduction in vessel speed as well as reliable distribution to four stlowly travelling rows will be evident in the ensuing specific description of the new apparatus.

How the foregoing and other more specific objectives of the invention are achieved will be evident in the more detailed description of a preferred embodiment of the invention which will now be set forth in reference to the drawing.

DESCRIPTION OF A PREFERRED EMBODIMENT

Figure 2:
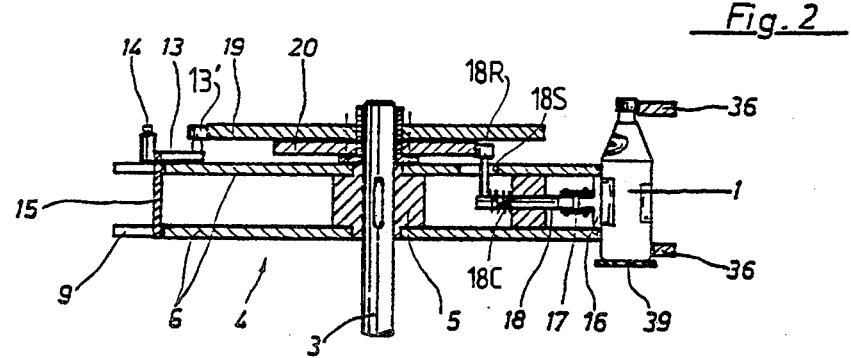
FIG. 2 is a section taken on a line corresponding with 2—2 in FIG. 1.
Figure 1:
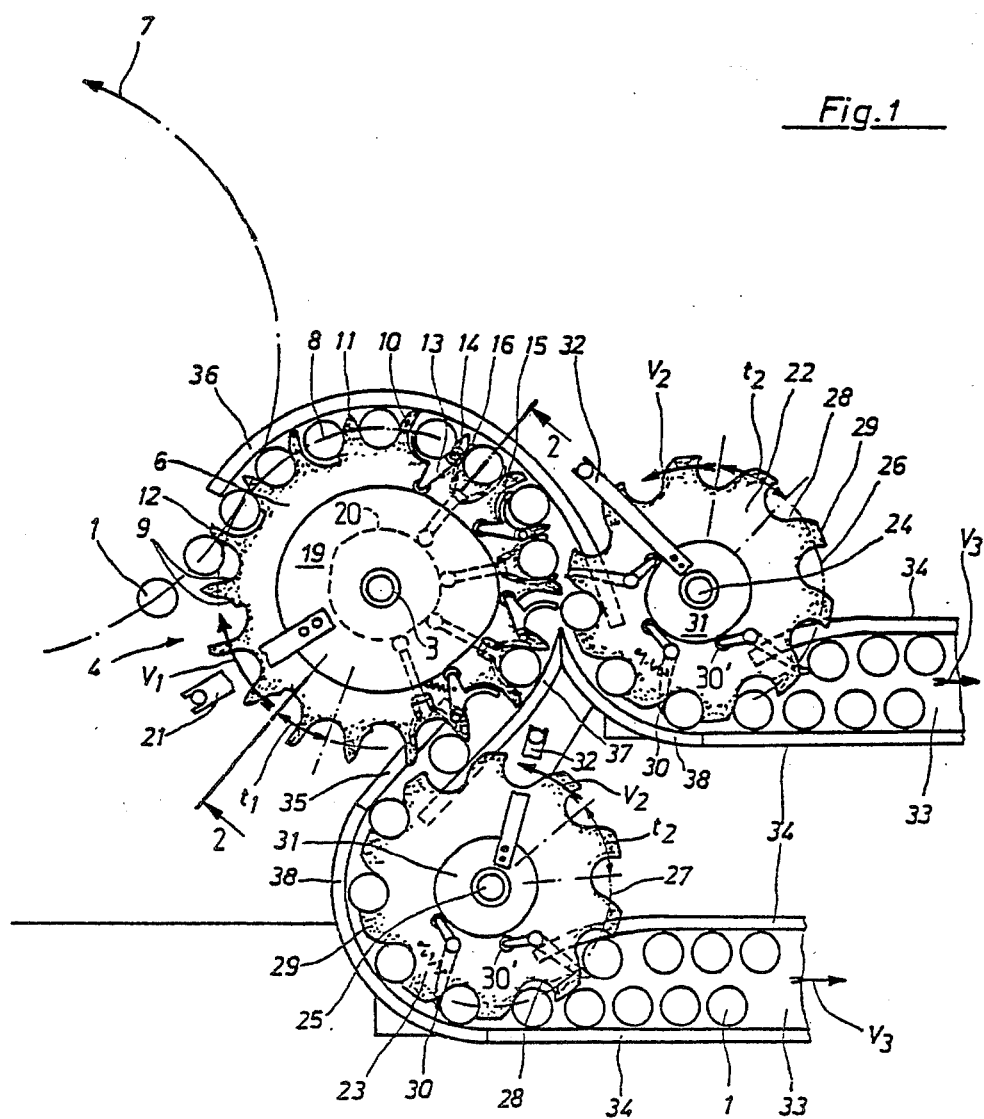
FIG. 1 is a plan view of the vessel divider or distributing apparatus in which the upper parts of the stationary guide members are omitted.

The apparatus for distributing bottles being transported in a single row into four rows is depicted in FIGS. 1 and 2. The word "bottle" is used herein as the generic term for any type of vessel, container or article. The bottles in the single row may be transported on a rotary table, not shown, along a circular path that is indicated by the arrowheaded dashed-dot line marked 7. One of the bottles in the single row and curved path has the reference numeral 1 applied to it and this number designates any of the bottles. The single row of bottles following circular path 7 may be the output of a labelling machine, not shown, for example. The apparatus provides for dividing or distributing the single row of incoming bottles into four individual rows two of which become output on each of two linear conveyors 33 which are shown in the right region of FIG. 1. The rotary table which feeds the row of bottles in along curved path 7 may be a star-wheel that has pockets, not shown, for retaining the successive bottles.

Located in the left region of the FIG. 1 apparatus is a rotor 4 which is somewhat like a star-wheel and is fixed on a rotatably driven shaft 3. As can be seen in FIG. 2, rotor 4 is comprised of upper and lower plates 6 that are spaced apart by a block 5. As can be seen in FIGS. 1 and 2, plates 6 which comprise the rotor 4 have recesses or pockets 9 in their outer periphery or circumference for receiving vessels or other articles such as bottles 1 from path 7.

On rotor 4 the bottles are transported clockwise as shown in a circular path indicated by the circular imaginary dashed-dot line 8. The circular path 8 has a radius with respect to the center of shaft 3 that coincides with the distance at which the centers of the respective bottles are displaced radially from the axis of shaft 3. The spacing or pitch from center to center of adjacent bottle-accommodating pockets 9 in the rotor 4 is marked $t_1$ and this pitch dimension is the same as the pitch of the pockets, not shown, in the rotary table on which the single row of bottles is carried along path 7. The peripheral or orbital velocity of the bottles moving in circular path 8 is designated as $V_1$ and is the same as the velocity as along circular path 7. The crown line or circle of the star teeth 10 projecting between the pockets 9 in rotor 4 has a greater diameter than circle 8 by an amount which is somewhat smaller than half of a bottle diameter. The pockets 9 in rotor 4 widen radially outwardly beyond circle 8 and alternate star-wheel teeth 10 have different shapes. One half of the star-wheel teeth 10 on rotor 4 extends outwardly and terminates in a pointed tip 11 formed by means of two opposite quarter circles while the other half has a locking or nesting surface 12 directed tangentially to the crown line or circle 8 and lying between two opposite rounded off parts. The function of this locking surface 12 will be elaborated later. The star-wheel teeth 10 with the locking surfaces 12 are somewhat curved in the direction in which the bottles are conveyed by rotor 4.

Alternate pockets or, stated in another way, every other pocket 9 on star-wheel rotor 4 that has a locking surface 12 has associated with it a generally U-shaped pivotal arm, called a slide member 13, that is arranged in radially extending fashion. Each slide member 13 has a lever part which is swingable on a stub shaft 14 that is fixed to the top plate 6 of the rotor 4. The stub shaft 14 is fixed in the area of the star-wheel arm 10 that has the pointed tip 11 forming the forward limit of the associated pocket 9. The other end of the slide member lever extends slantingly inwardly and carries a guide roller or follower 13 that is in contact with the contour of a stationary cam 19.

Between the two ends of the slide member or lever 13 is an extension 15 which has a curved cross-section as shown in FIG. 1 and projects downwardly into the adjacent associated pocket 9. This extension projects in a direction opposite of the direction in which the bottles are conveyed on the rotor 4 and it forms a part of the back of the pocket. The upper and lower star-wheel plates 6 are provided with corresponding recesses for acommodating extensions 15 on slide mamber or lever 13. The extension 15 is provided with an elastic cushion. not visible, which forms the actual effective surface of the slide member 13 on which the bottles come into contact.

The alternate pockets located between any two pockets 9 that have a slide member 13 associated with them are provided with holding means for the bottles 1 comprising two cooperating clamp arms 16. Each clamp arm 16 is formed by a curved piece of sheet metal and is guided slidably by means of curved grooves, not visible, constructed on the bottom side of the upper star-wheel plate 6 and on the upper side of the lower star-wheel plate 6 concentrically to its radius of curvature. The radially inward lying ends of each pair of cooperating clamp arms 16 are connected by means of fish-plates 17 to a radially slidable rod 18 located in the rotor 4. Rod 18 carries on its upper side a guide roller 18R or follower that runs on or follows the profile of a stationary cam 20. The rods that carry the guide rollers project upwardly out over the rotor 4 as can be seen in FIG. 2 and are guided in slots 18S which serve as security against rotation of rod 18.

The cam follower rollers 13' on the other slide members 13 are spring biased against the profile or outer periphery of stationary cam 19. The rollers 18' on the upstanding part of rods 18 are biased by a coil spring 18C against the profile or periphery of stationary cam 20. The cams 19 and 20 are secured against rotation and supported on a bar 21 which is in turn supported on a stationary vertical column or the like, not shown. The slide members 13 and the clamps 16 are actuated to grip and release bottles by their cooperating action with the stationary cams 19 and 20 which results from rotation of rotor 4. Instead of flat plate cams 19 and 20 being used, cams, not shown, having grooves of the same configuration as the profiles of cams 19 and 20 could be used in which case springs for pressing the followers against the cams could be eliminated.

Arranged adjacent rotor 4 and driven rotationally in synchronism therewith are two star-wheel conveyors 22 and 23 which are fixed on power-driven shafts 24 and 25. Star-wheels 22 and 23 are driven rotationally oppositely of star-wheel rotor 4. The circumferential or peripheral speed $V_2$ of the two star-wheels 22 and 23 along circles 26 and 27 indicated by dashed-dot line is less than the circumferential or peripheral speed $V_1$ of rotor 4. The circles 26 and 27 lie opposite of dashed-line circle 8 of the rotor 4 in each case at a distance which at its narrowest place is only slightly less than the diameter of a bottle. The star-wheel conveyors 22 and 23 are constructed of two congruent upper and lower disks and are provided at their peripheries with pockets 28 that are formed by recesses in the periphery of the star-wheel plates. The angular distance or pitch $t_2$ of pockets 28 lies between the division $t_1$ of the rotor 4. More specifically, the pitch $t_1$ is related to the pitch $t_2$ as $V_1$ is related to $V_2$. The crown line or circle of the teeth 29 of the star-wheels 22 and 23, respectively, projecting between the pocket 28 extend outwardly farther than the radius of the circles 26 and 27, respectively and lies at the narrowest point opposite the crown line or circle of the rotor 4 with little spacing. The pockets 28 in the star-wheel conveyors 22 and 23 are shaped within the circles 26 and 27 to the bottle curvature or cross-section and widen outwardly or diverge beyond the circles 26 and 27. As can be seen by inspection of FIG. 1, the pockets 28 of star-wheels 22 and 23 are outlined by essentially a semicircular line over one part that is confluent with a line that extends in the direction of star-wheel rotation. The curved portion of the outline has a radius substantially equal to that of the bottle that is accommodated in the pocket.

Every other or alternate pocket 28 on each star-wheel conveyor 22 and 23 is provided with a swingably mounted clamping lever 30 which carries a cam follower roller 30' on one end. Clamping levers 30 are comparable to a bell crank. The cam follower rollers 30' are spring biased against a stationary cam plate 31 positioned over the driver shafts 24, 25, respectively, of the star-wheels 22 and 23, said cam plates being secured against rotation by reason of their being supported on bars 32. By coaction with the two cam plates 31, the clamping levers 30 are movable back and forth upon rotation of the star-wheels 22 and 23 between a position of rest wherein they are withdrawn from pockets 28 and a clamping position which they obtain when projecting into a pocket 28 to thus hold a bottle in the pocket.

Each star-wheel conveyor 22 and 23 is situated adjacent its own take-out conveyor belt 33 which is driven at a speed $V_3$ that is less than the circumferential speed $V_2$ of the star-wheel conveyors 22 and 23. The two conveyor belts 33 are at least twice as wide as the diameter of a bottle and have stationary laterally spaced apart side rails 34 at their sides or edges.

As the bottles orbit around on rotor 4 they reach two transfer stations in succession. At the first transfer station, one of the bottles in the series on the rotor 4 is transferred to a pocket on star-wheel 22 and at the second transfer station, the next bottle in the series on the rotor 4 is transferred from rotor 4 to star-wheel 23. There is a first guide member 35 that begins at the second transfer station or point and is tangential to the inner side of the path of movement of the bottles in rotor 4 and extends substantially linearly and tangentially to the outer side of the path of movement of the bottles in the second star-wheel conveyor 23. A second guide member 36 extends from the in-feed station of the rotor 4 up to the first transfer point in a circular path outside the path of movement of the bottles on rotor 4 and then takes on an involute shape where it increases in distance from the rotor axis and finally becomes linear in an area tangential to the inner side of the path of movement of the bottles in the first star-wheel conveyor 22. A third guide member 37 begins shortly behind the first transfer point on the outer side of the path of movement of the bottles 1 in the rotor 4 and extends in a slightly circular fashion and passes over into a linear section which extends to form a guide channel for the bottles 1 parallel to the first guide member 35. At the beginning of the third guide member 37 a circular guide member 38 is attached such that a point or apex is formed at the junction of guide members 37 and 38. Guides member 38 retains bottles 1 in the pockets 28 of the first star-wheel conveyor 22 and extends over the rail 34 of conveyor belt 33 on which one pair of the two pairs of double rows of bottles are formed by the discharge from star-wheel 22. In FIG. 1, only the lower parts of the guide members 35, 36 and 38 are shown and these members are those which engage the bottles 1 below the star-wheels in the region just above the bottle bottom. The upper parts of the guide members which are not shown but are similarly shaped and congruent with the lower parts engage the bottles above the star-wheel conveyors in the neck area of the bottles. Also, only part of the slide members 13, clamp 16 and clamping levers 30 and the springs which position them are shown.

Operation of the apparatus thus far described is as follows: The labelled bottles 1, for example, travel along the single row path 7 on a continuously rotating table, not shown, without alteration of their translational speed. The bottles enter the adjacent pockets 9 of the continuously rotating rotor 4 where they are guided and retained by the second guide member 36 while they are being transported in an orbital path leading to a first discharge station. While they are in between the input station and first discharge station, alternate bottles are held securely on the rotor by means of clamps 16 which are closed at this time. In continuing their orbital path on rotor 4, the bottles are moved in pockets 9 that are provided with the slide members 13, particularly by means of the curved surfaces of the extensions 15 gradually radiating outwardly whereby, by means of extensions 15, the front prong or teeth 10 of the pockets 9 and the second guide member 36 the bottles are securely guided. The bottles, upon passing the line that connects between the axes of rotation of the rotor 4 and the first star-wheel conveyor 22 stand approximately midway between the dashed-dot circles 8 and 26 associated with the rotor 4 and star-wheel conveyor 22, respectively. The bottles at this point have already begun to move toward the outside of the circles 8 and 26 and extend partially already into the pockets 28. The timing is such that the bottles go into the curved portions of the pockets 28 in the star-wheel conveyors gently and without impact. The radial outward movement of the bottles from the rotor 4 is continued until the bottles encounter the forward side of the pockets 28 and are braked or retarded to the speed $V_2$ of the first star-wheel conveyor 22. Shortly before this, the conveyance speed is somewhat diminished as at this time the extensions 15 of the slide members 13 and the rearward projecting parts or teeth of the pockets 9 on the rotor 4 travel more rapidly than the pockets 28 of the first star-wheel conveyor 22 so that they overtake the same and thereby press the bottles completely into the pockets 28 and hold them there until they have passed the tip or apex on the third guide member 37 or on the circular guide 38, respectively. In this connection, the pockets 28 on star-wheel conveyor 22 are temporarily closed by means of the locking surfaces 12 on the corresponding teeth 10 or through the ends of the extensions 15, respectively. The relationship of the parts is such that bottles are transferred without impact and, hence, with minimum noise.

After the bottles pass the first transfer point, they are transferred into the first star-wheel conveyor 22 which has a circumferential speed $V_2$ and pitch or angular spacing $t_2$ and are conveyed further whereby they are held by means of the circular guide 38 in the pockets 28. In addition, every second or alternate bottle from the rotor 4 is grasped by a clamping lever 30 on the star-wheel conveyor and is additionally held. At the output point of the first star-wheel conveyor where a rail 34 on the side of the conveyor belt 33 is attached to the curved guide 38, the bottles travel out of the pockets 29 that are without a clamping lever 30 and pass onto the conveyor belt 33 that is moving synchronously but slower than at the conveyor speed $V_3$. Because of the rearward rounding of the pockets 28 and the wiping action they have on the bottles, an impact-free retardation of the bottles is achieved. The next bottle in sequence on the star-wheel conveyor 22 is held by means of the clamping lever 30 somewhat longer in the pockets 28 so that these bottles form a second row adjacent the bottles discharged a partial revolution earlier from star-wheel conveyor 22, whereby these bottles are taken out of the pockets by means of the curved beginning region of the corresponding rail 34. The linear conveyor speed $V_3$ is so selected that the bottles travelling out of the first star-wheel conveyor are conveyed in two rows with mutual spacing at about one-fourth of the rotor 4 tangential speed $V_1$.

Bottles held by the clamps 16 in the rotor 4 that are between the bottles associated with the slide members 13 pass by the first transfer point in clamped condition, that is, without radial movement, until they reach the effective area of the third stationary guide member 37. At this time, the clamps 16 are opened and the then released bottles begin a radial movement, which in principle corresponds with that at the first transfer point but is not controlled by means of slide members but exclusively by means of two guide members 35 and 37. Also, at the second transfer point the bottles are gradually moved out of the pockets 9 of the rotor 4 into the pockets 28 of the second star-wheel conveyor 23 and thereby retarded to the speed $V_2$. The further course of the bottles in the second star-wheel conveyor 23 corresponds to that in the first star-wheel conveyor 22, that is, the bottles upon transfer to a conveyor belt 33 are again deployed into two rows and retarded to the speed $V_3$. Thus, between input and output of the system bottle speed reduces from $V_1$ to $V_2$ to $V_3$.

It should be mentioned that the bottles 1 are supported for being slid by means of stationary smooth surfaces 39 when the bottles are not positively supported in the rotary table that follows the path 7 or on the conveyor belts 33. The apparatus is not limited to handling perfectly cylindrical bottles. By suitably shaping the pockets in the star-wheels and the guide members it is also possible to handle bottles of various shapes such as oval or substantially rectangular bottles.

Although a preferred embodiment of the bottle distributing apparatus has been described in detail, such description is intended to be illustrative rather than limiting, for the components of the apparatus can be variously modified so the scope of the invention is to be limited only by interpretation of the claims which follow.

I claim:

1. Apparatus for converting a series of moving vessels such as bottles into a plurality of rows of vessels comprising:

a rotationally driven generally circular rotor (4) having circumferentially spaced apart prongs (10, 11) extending radially outward from the periphery of the rotor, said prongs defining pockets between them for receiving said vessels in series, alternate prongs (10) being curved in the direction of rotor rotation and extending radially beyond a pitch circle (8) whose radial distance from the center of rotor rotation coincides with the center of the vessels and permits said alternate prongs to remove vessels from said single row at an in-feed station and move them in sequence orbitally on said rotor, releasable gripper means provided on said rotor for gripping the vessels when they enter the pockets at the in-feed station and while they are in orbit on the rotor, said releasable gripper means comprising first and second sets of gripper means respectively associated with alternate pockets of said rotor, means for acutating said gripper means (13, 16) to grip when the bottles enter the pockets and to release the grip and urge alternate vessels radially outwardly at first and second transfer points, respectively, first and second star-wheel conveyors located adjacent said first and second transfer points, respectively, said star-wheel conveyors (22, 23) being drivable in synchronism with the rotor, in the opposite direction of rotation and at lower peripheral speed than the rotor, said star-wheel conveyors each having circumferential spaced apart pockets at its periphery for receiving vessels, said pockets being on a pitch circle (26, 27) whose radial distance from the center of rotation of the star-wheel conveyors is such that a space of at least one-half of a vessel diameter exists between the pitch circle (8) of the rotor (4) and the pitch circles (26, 27) of the star-wheel conveyors (22, 23), a guide member (36) disposed partially around said rotor (4) and diverging away from said rotor while extending across the rotational path of said pockets (28) in said first star-wheel conveyor (22) so that when one of said alternate gripper means releases a vessel in the series from the rotor in the vicinity of said first transfer point said vessel will be moved under the influence of said rotor and guided by said guide member (36) into a pocket on said more slowly rotating first star-wheel conveyor, another guide member (37) disposed outside of the periphery of said rotor and extending from beyond where said one of the vessels has entered a pocket in the first star-wheel conveyor to across the path of the pockets (28) in said second star-wheel conveyor (23) and still another guide member (35) having an end disposed across the path of the pockets in said rotor (4) and extending partially around said second star-wheel conveyor so that when another of said alternate gripper means releases in the vicinity of said second transfer point another vessel from the rotor (4) that was formerly next to said one vessel in the series said other vessel will be moved under the influence of said rotor and guided by said guide-members (37, 35) into a pocket of the more slowly rotating second star-wheel conveyor (23).

2. Apparatus according to claim 1 wherein said space between the pitch circle (8) of the rotor (4) and the pitch circles (26, 27) of the star-wheel conveyors (22, 23) is slightly less than the vessel diameter.

3. The apparatus according to any of claims 1 or 2 wherein said means for actuating said gripper means actuate said gripper means to begin moving a vessel radially outwardly from a rotor pocket before the vessel reaches the transfer point.

4. The apparatus according to any of claims 1 or 2 wherein said first mentioned guide member (36) extends from near the infeed station to the rotor (4) up to the first transfer point and said other guide member (37) extends from the first transfer point to the second transfer point.

5. The apparatus according to any one of claims 1 or 2 wherein said gripper means operates to release a vessel from said rotor relative to said guide members (35, 36, 37) such that the vessels, upon having passed the lines connecting the axis of rotation of the rotor (4) and the axes of rotation of the star-wheel conveyors (22, 23), are midway between the pitch circle (8) of the rotor and the pitch circles (26, 27) of the corresponding star-wheel conveyors (22, 23).

6. The apparatus as in any of claims 1 or 2 wherein when said first set of gripper means (13) are actuated to urge a vessel radially outwardly from a pocket (9) in the rotor (4) as aforesaid, said first set of gripper means remains in a position which it attains to urge out the vessel until having overtaken and thereby blocking off the vessel transferred to the pocket (28) of the first star-wheel conveyor (22).

7. The apparatus according to any one of claims 1 or 2 wherein the stationary guide members (35, 36, 37) in the region before said transfer points extend outwardly tangentially to the path of movement of the vessels in the rotor.

8. The apparatus according to any one of claims 1 or 2 wherein the crown line circle of the star-wheel teeth (29) between the pockets (28) of the two conveyor stars (22, 23) is larger than their pitch circle (26, 27).

9. Apparatus according to any one of claims 1 or 2 including:

a plurality of clamping means (30) supported on said star-wheel conveyors (22, 23) for holding every other vessel of the series of vessels that have been transferred into the pockets (28) of said conveyors (22, 23) for a predetermined portion of its orbital path in said pocket, means (31) for operating said clamping means (30) to effect clamping of said every other vessel in its pocket after transfer has occurred and for unclamping said vessel when it has reached the end of said predetermined portion of its orbital path, linear conveyors (33) over which said clamped vessels and the vessels between them are moved orbitally by said star-wheel conveyors (22, 23), said linear conveyors being arranged such that unclamped vessels between clamped vessels on said star-wheel conveyors can depart from said pockets (28) at one side of said linear conveyor to produce one row of vessels thereon after which said every other vessel remains clamped until it reaches the end of said portion of its orbit path whereupon it is unclamped to form another row of vessels on the same linear conveyor.

10. The apparatus according to claim 9 wherein the translational speed of said linear conveyors (33) is less than the linear speed of the vessels while in the star-wheel conveyors.

11. The apparatus according to claim 9 wherein said pockets (28) in the star-wheel conveyors (22, 23) are shaped to have a first portion that has the contour of the vessel exterior against which the vessel rests when it is being orbited and has a rounded off portion continuous with the first portion and trails the first portion in respect to the direction of star-wheel conveyor rotation such that the vessel is wiped out smoothly from said pocket by said rounded off portion and onto said linear conveyor.

12. The apparatus according to any of claims 1 or 2 wherein:

said first set of releasable gripper means on said rotor (4) and associated with its respective set of alternate pockets around the rotor comprises a gripper member (13) having one portion extending generally radially and pivotally mounted to the rotor wherein the pivot axis is ahead in the direction of rotor rotation and between pockets and said member has a curved portion extending over the radially inward part of the pocket that trails the pivot axis whereby the vessel being transported in the pocket rests in the curved portion.

13. The apparatus according to claim 12 wherein: each said gripper member (13) is pivoted on the top side of the rotor (4) and has a cam follower roller at the radially inward end of its said one portion, a cam (19) arranged stationarily above said rotor (4) for said roller to follow the cam profile as said rotor rotates, to thereby actuate said gripper member (13) sequentially to grip and release a vessel.

14. The apparatus according to claim 13 wherein there is a curved extension (15) projecting downwardly from said member (13) into a pocket (9).

15. The apparatus in accordance with any of claims 1 or 2 wherein:
said rotor (4) comprises two congruent plates (6) fixedly connected to each other,
said second set of gripper means for its respective set of alternate pockets (9) on said rotor comprising two curved clamps (16) and rod means (18) to which the clamps are coupled,
means for guiding said rod means for reversible radial movements in the rotor (4) between a position of rest retracted from the pocket (9) and an operating position projecting into the pocket, and
a stationary cam (20) arranged above the rotor (4) and a cam follower roller (18R) on said rod (18) for following the profile of said cam (20) to move said rod (18) radially.

* * * * *